United States Patent [19]
Toth et al.

[11] 3,975,614
[45] Aug. 17, 1976

[54] ELECTROSLAG WELDING SPEED CONTROL

[75] Inventors: Tibor Endre Toth; Steven Finn Hardwick, both of Florence, S.C.

[73] Assignee: Union Carbide Corporation, New York, N.Y.

[22] Filed: Jan. 2, 1975

[21] Appl. No.: 537,843

[52] U.S. Cl................................. 219/126; 219/73; 219/124
[51] Int. Cl.².......................................... B23K 25/00
[58] Field of Search............... 219/126, 73 A, 73 R, 219/124

[56] References Cited
UNITED STATES PATENTS
2,997,571  8/1961  Smout............................. 219/126

FOREIGN PATENTS OR APPLICATIONS
13,848  3/1966  Japan................................. 219/126
427  9/1968  Japan................................. 219/124
18,608  5/1971  Japan............................. 219/731 R Primary Examiner—J. V. Truhe
Assistant Examiner—Clifford C. Shaw
Attorney, Agent, or Firm—John R. Doherty

[57] ABSTRACT

An improved vertical electroslag welding system wherein the driving motor which propels the molding shoes is controlled by varying its speed in response to electrode current thereby assuring a molten puddle which for any set speed will not rise over the cavity wall or become too fluid. The motor is remotely controlled so that the welding current is not directly coupled to the control circuit.

3 Claims, 2 Drawing Figures

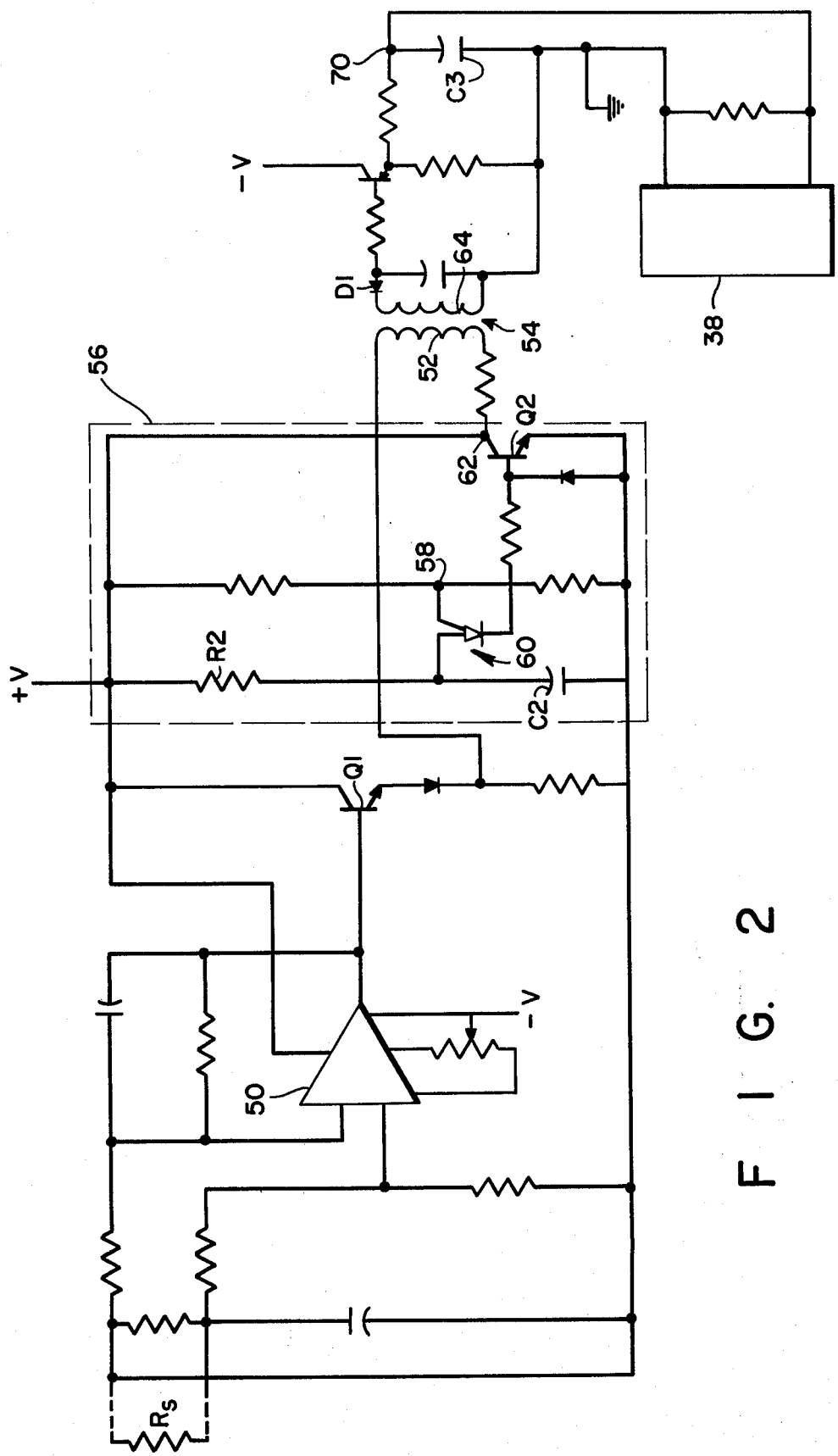
F I G. 2

ELECTROSLAG WELDING SPEED CONTROL

This invention relates to a welding speed control for welding in a vertical direction under a blanket of molten slag.

BACKGROUND OF THE INVENTION

In vertical electroslag welding, the workpieces to be welded are vertically aligned with a gap exposed between their parallel edges. Two molding shoes, usually of copper, are located on both sides respectively of the gap with their interiors contoured to form in conjunction with the gap a cavity into which is added a granular flux and filler metal. The filler metal is continuously supplied from a spool of consumable electrode wire. Current is passed through the electrode to form within the cavity a puddle of molten metal and slag. A driving mechanism propels the copper molding shoes, the accessory equipment to make the weld, and the consumable electrode upward along the gap resulting in the vertical progression of the weld. The speed of the driving mechanism is typically set at a speed of between about 3–10 inches per minute depending upon the welding conditions and parameters. The height of the puddle of molten metal and slag must be controlled as the molding shoes move upward. Otherwise, if the puddle remains too fluid as the shoes advance molten metal will run out from under the cavity or alternatively if the puddle height gets too high molten metal will spill over the cavity walls. Heretofore, puddle height regulation was accomplished by varying the electrode wire feed speed in response to variations in the level of electrode current. At higher travel speeds however, regulation was unsatisfactory. A more responsive and more reliable control was found in directly varying the speed of the driving mechanism.

Accordingly, it is the principle object of the present invention to provide a speed control for regulating the molten weld puddle height independent of the wire feed motor speed and in direct response to electrode current.

It is a further object of the present invention to provide a speed control for electroslag vertical welding which regulates the speed of advance of the cavity forming molding shoes in direct response to the welding current but electrically remote therefrom.

Other objects and advantages of the present invention will become apparent from the following detailed description when taken in connection with the accompanying drawings of which:

FIG. 1 is a perspective view of the electroslag welding process accompanied by a schematic showing of the welding speed control of the present invention; and FIG. 2 is a circuit diagram of the welding control circuit of FIG. 1.

DETAILED DESCRIPTION OF THE INVENTION

Figure 1:
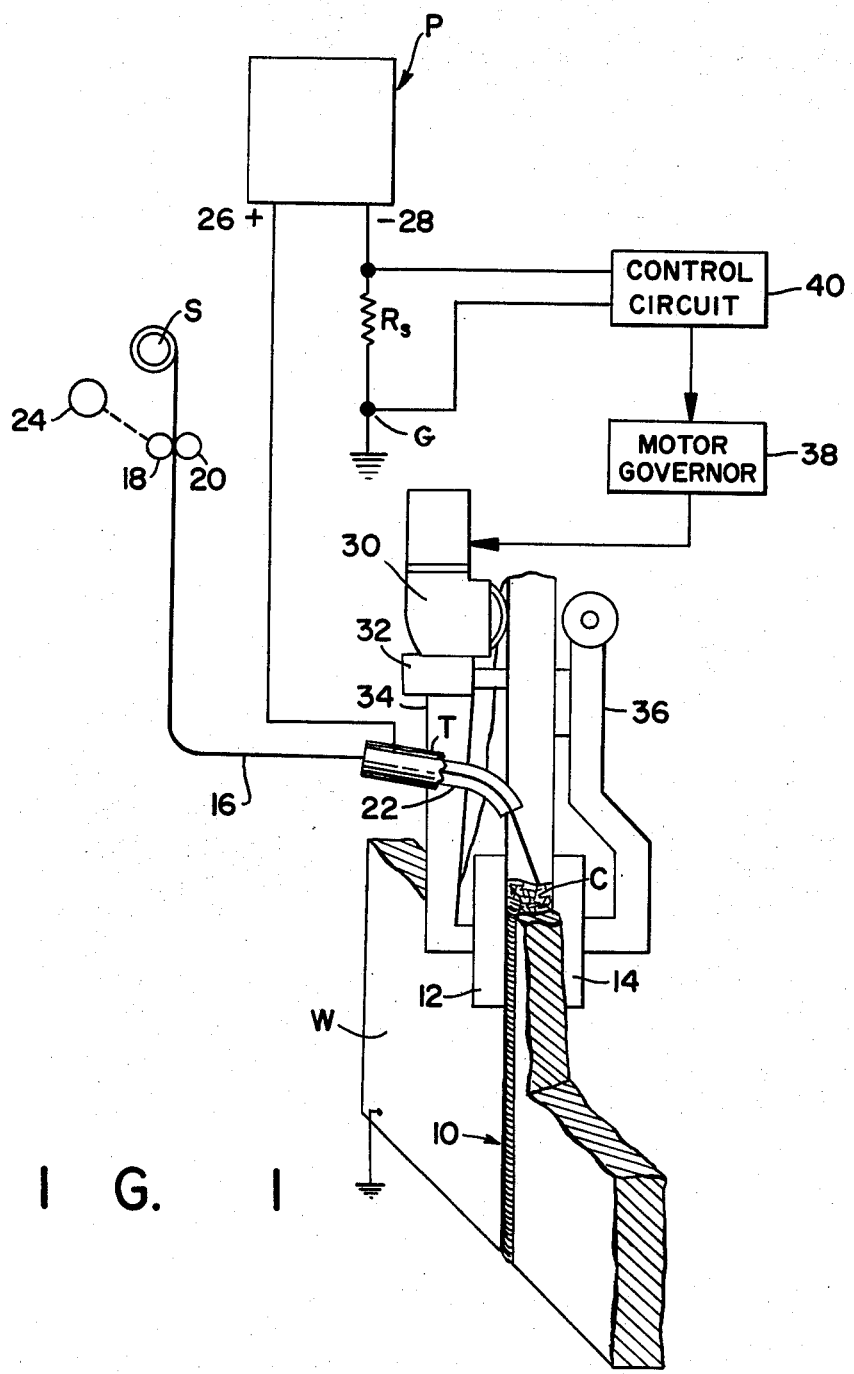

Referring now to FIG. 1 illustrating a vertical electroslag welding operation with one of the workpieces W shown partially cut away to expose the cavity C. A molten pool of metal is formed in cavity C beneath a molten slag, the combination of molten metal and slag being hereafter referred to as the molten puddle which is permitted to solidify at a controlled rate in order to form the welded joint 10 in the cavity C between the workpieces. Any conventional edge configuration may be employed before proceeding with the welding operation.

On each side of the cavity C is located a molding shoe 12 and 14 respectively which may be internally configured to control the exterior shape of the welded joint 10. Filler weld metal is deposited into the cavity C from a wire electrode 16 which is fed from a supply reel S through the contact tube 22 of torch T by means of feed rolls 18 and 20 respectively. The feed rolls are independently driven by motor 24. The contact tube 22 is connected to the positive terminal 26 of power supply P. The negative terminal 28 of power supply P is connected through a shunt resistor Rs to a ground terminal G and to the workpieces W. The equipment for raising the molding shoes 12 and 14, torch T and the associated wire electrode feed apparatus is conventional and does not as such form part of the present invention. Typically, such equipment includes a drive motor 30, a framework 32, only partially shown, including means (not shown) affixed to the workpiece, or to some stationary object at a fixed height and guide arms 34 and 36 connected to the framework 32 and molding shoes 12 and 14 for raising the shoes along the gap between the workpieces relative to the fixed location. A motor governor 38 is conventionally employed to maintain the output of drive motor 30 constant at any given drive motor set speed. The control circuit 40 applies an input to the drive motor governor 38 as will be explained in detail hereafter for varying the speed of the drive motor 30 in response to variations in welding current.

The welding process is initiated in a manner typical to electroslag welding by starting an electric arc beneath a blanket of a granular flux initially deposited into the cavity C. The arc melts the flux forming a molten slag which in turn melts the edges of the workpieces W and the immersed end of the electrode 16 thereby providing a molten pool of metal which settles beneath the molten slag and slowly solidifies to form the vertical welded joint 10 in the gap between the workpieces. As the bottom of the puddles begins to solidify the molding shoes are advanced vertically upward. The solidification rate is determined by the composition of each of the following; workpiece, flux and filler electrode wire respectively, as well as the cavity volume, the electrode wire stick out, and the magnitude of the electrode current.

It has been established in accordance with the present invention that the molten puddle height may be controlled by varying the speed of the drive motor 30 in response to variations in electrode current. This in turn allows the molding shoes to travel at any given set speed without affecting the welding operation.

The control circuit 40 for regulating the speed of drive motor 30 is schematically shown in FIG. 2.

The shunt resistor Rs develops a DC voltage proportional to the welding current through electrode 16. The welding current directly influences the electrode wire stick out which is proportional to the height of the molten puddle. The DC voltage developed across the shunt resistor Rs is amplified by amplifier 50, which may represent a standard 741 operational amplifier, and applied through transistor Q1, connected as an emitter follower, to the input winding 52 of pulse transformer 54. Input winding 52 of pulse transformer 54 is also connected in series circuit relationship with the output from the oscillator circuit 56.

Oscillator circuit 56 is of the relaxation type whose frequency is controlled by the RC time constant of resistor R2 and capacitor C2 and the applied power supply voltage V. Capacitor C2 charges to a voltage during each cycle of oscillation equal to the voltage at gate terminal 58 of the programable unijunction transistor (PUT) 60. When this voltage is reached the programable unijunction transistor 60 fires and the capacitor C2 discharges through transistor Q2 turning off the programable unijunction transistor 60 and initiating a new charging cycle. The programable unijunction transistor 60 is a commercially available solid state negative impedance device.

The output 62 at the collector of transistor Q2 is connected in series with the input winding of pulse transformer 54 and the DC output from transistor Q1. The DC output from transistor Q1 is thus modulated and transferred from the input winding 52 to the output winding 64 of pulse transformer 54. The alternating signal in output winding 64 is rectified by diode rectifier D1 and in turn filtered through capacitor C3 back to a DC voltage at the output terminal 70 of the control circuit 40. The DC voltage at the output terminal 70 is proportional to the voltage across the shunt resistor Rs.

In operation any change in welding current due to a change in the electrode wire stick out will vary the voltage across the shunt resistor Rs. This will be reflected in a change in the output DC level at the output terminal 70 of control circuit 40. the output at terminal 70 is applied as an input to the motor governor 38 which regulates the speed of the drive motor 30. The speed of drive motor 30 is thus remotely varied in response to changes in welding current slowing the vertical travel rate for decreasing wire stick out and vice versa.

It is to be understood that although a pulse transformer 54 was chosen as the transducer for transposing the DC signal output from the amplifier 50 other conventional transducer means may be used in place thereof.

What is claimed is:

1. In a system for welding workpieces in a substantially vertical direction comprising, a pair of molding shoes slidably engaging said workpieces along a gap formed between the workpieces to be welded, said molding shoes surrounding said gap for forming a cavity of predetermined geometry; means for advancing a consumable electrode into said cavity at a predetermined speed, means for passing a current through said electrode for forming a molten weld puddle within said cavity, and driving means for moving said molding shoes vertically upwards along said gap, the improvement of which comprises; control means which produce a direct current signal for varying the speed of said driving means in response to variations in the magnitude of said electrode current, said control means comprising: means for providing a direct current output in response to the magnitude of said electrode current; oscillator means for generating an oscillating alternating output signal at a predetermined frequency, said oscillator means being connected to said direct current output such that the magnitude of said alternating output signal is modulated by said direct current output; transducer means for providing a varying output response to said modulated alternating output signal; and means for converting said varying output to said direct current signal the magnitude of which varies in proportion to said direct current output.

2. In a system as defined in claim 1 wherein said transducer is a pulse transformer.

3. In a system as defined in claim 2 wherein said means for converting said varying output comprises a rectifier and filter.

* * * * *